United States Patent
Dagorn et al.

(10) Patent No.: US 8,639,289 B2
(45) Date of Patent: Jan. 28, 2014

(54) SYSTEM FOR MANAGEMENT OF AUTHENTICATION DATA RECEIVED BY SMS FOR ACCESS TO A SERVICE

(75) Inventors: Anne-Sophie Dagorn, Rennes (FR); David Picquenot, Saint Contest (FR); Pierre Lemoine, Benouville (FR)

(73) Assignee: France Telecom, Paris (FR)

( * ) Notice: Subject to any disclaimer, the term of this patent is extended or adjusted under 35 U.S.C. 154(b) by 983 days.

(21) Appl. No.: 11/993,697

(22) PCT Filed: Jun. 20, 2006

(86) PCT No.: PCT/FR2006/050612
§ 371 (c)(1), (2), (4) Date: Mar. 19, 2008

(87) PCT Pub. No.: WO2006/136752
PCT Pub. Date: Dec. 28, 2006

(65) Prior Publication Data
US 2010/0151823 A1    Jun. 17, 2010

(30) Foreign Application Priority Data

Jun. 23, 2005  (FR) ...................................... 05 06421

(51) Int. Cl.
*H04M 1/00*    (2006.01)
(52) U.S. Cl.
USPC .................... 455/558; 455/557; 455/414.1
(58) Field of Classification Search
USPC ............... 455/41.2–41.3, 410, 411, 558, 557, 455/414.1; 713/155–168, 182–185; 726/2–6, 16–21, 26–30; 379/433.09; 340/5.8–5.81; 705/67
See application file for complete search history.

(56) References Cited

U.S. PATENT DOCUMENTS

| | | | |
|---|---|---|---|
| 2002/0155828 A1* | 10/2002 | Tuomainen et al. | 455/414 |
| 2004/0233893 A1* | 11/2004 | Zhou et al. | 370/352 |
| 2005/0021937 A1* | 1/2005 | Lambert | 713/151 |
| 2005/0131671 A1* | 6/2005 | Kashyap et al. | 703/24 |

(Continued)

FOREIGN PATENT DOCUMENTS

| DE | 101 02 779 | 8/2002 |
|---|---|---|
| DE | 10102779 A1 | 8/2002 |

(Continued)

OTHER PUBLICATIONS

International Preliminary Report on Patentability and English Translation of the Written Opinion dated Jan. 16, 2008 for corresponding International Application No. PCT/FR2006/050612, filed Jun. 20, 2006.

(Continued)

*Primary Examiner* — Barry Taylor
(74) *Attorney, Agent, or Firm* — Westman, Champlin & Koehler, P.A.; David D. Brush

(57) ABSTRACT

A system for managing at least one service access authentication data item, including a device for accessing at least one service. The system also includes a mobile terminal including a mechanism managing the authentication data item and an identifier of the service, a communication interface between the access device and the management mechanism, and a software interface configured to determine the service identifier and to utilize the management mechanism, via the communication interface, on access to the service. The system for example is applicable to website access authentication services.

12 Claims, 4 Drawing Sheets

(56) References Cited

U.S. PATENT DOCUMENTS

| | | |
|---|---|---|
| 2006/0005024 A1 | 1/2006 | Law |
| 2006/0005033 A1 | 1/2006 | Wood |
| 2006/0218396 A1* | 9/2006 | Laitinen et al. ............... 713/167 |
| 2007/0274524 A1 | 11/2007 | Ksontini et al. |

FOREIGN PATENT DOCUMENTS

| | | |
|---|---|---|
| JP | 11025051 A | 1/1999 |
| JP | 2001306513 A | 11/2001 |
| JP | 2002175281 A | 6/2002 |
| JP | 2002530772 A | 9/2002 |
| JP | 2003196241 A | 7/2003 |
| WO | 0031608 A2 | 6/2000 |
| WO | 01 15381 | 3/2001 |
| WO | 0115381 A1 | 3/2001 |
| WO | 2005/046278 A2 | 5/2005 |

OTHER PUBLICATIONS

International Search Report dated Mar. 21, 2007 for corresponding International Application No. PCT/FR2006/050612, filed Jun. 20, 2006.

English translation of Chinese Office Action dated Mar. 28, 2012 for corresponding Chinese Application No. 200680022605.4.

* cited by examiner

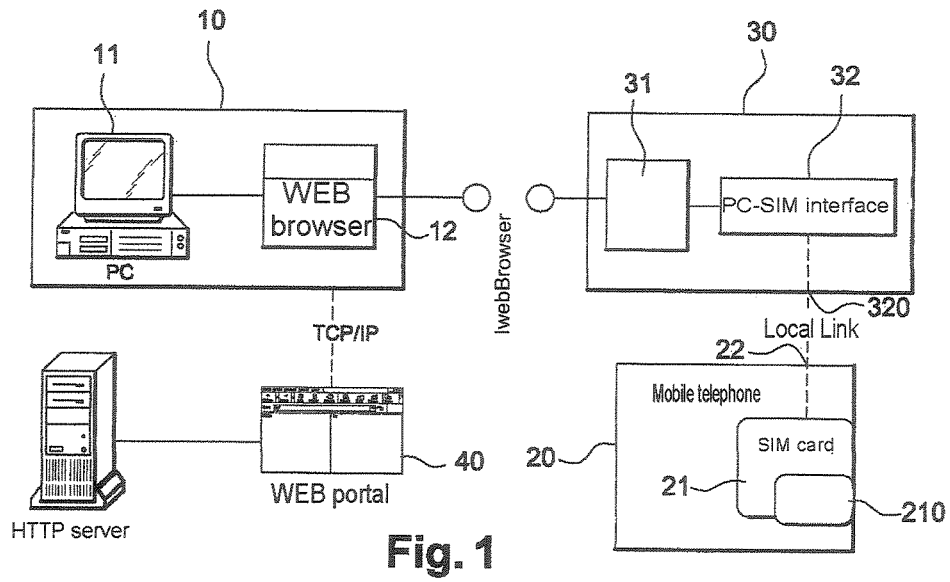
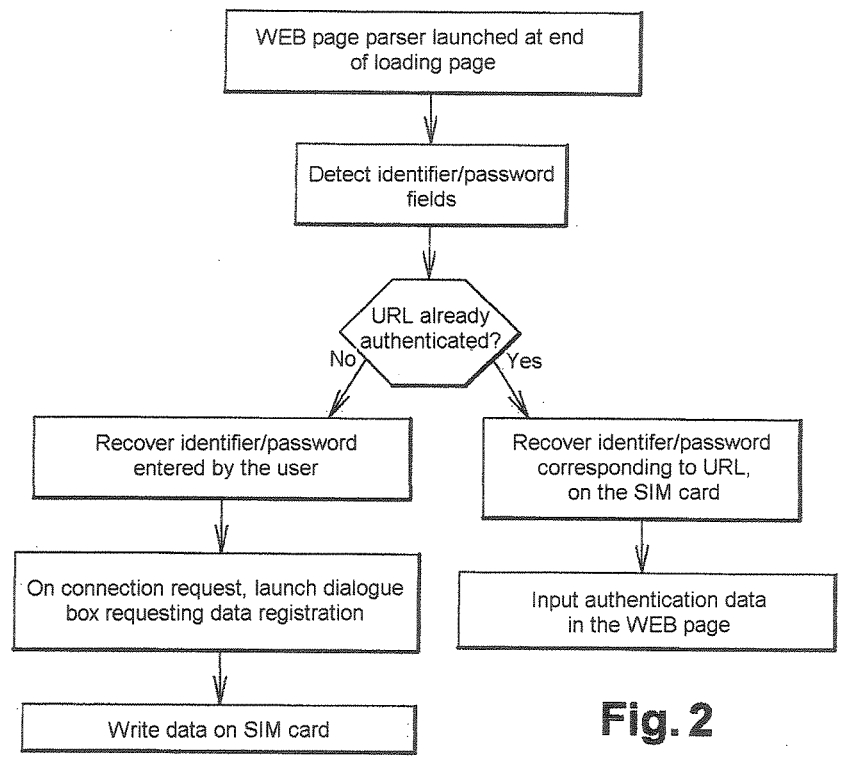
Fig. 1
Fig. 2

SYSTEM FOR MANAGEMENT OF AUTHENTICATION DATA RECEIVED BY SMS FOR ACCESS TO A SERVICE

CROSS-REFERENCE TO RELATED APPLICATIONS

This Application is a Section 371 National Stage Application of International Application No. PCT/FR2006/050612, filed Jun. 20, 2006, published as WO 2006/136752 A3 on Dec. 28, 2006, not in English, the contents of which are hereby incorporated by reference in their entireties.

The present invention relates to a system for managing at least one service access authentication data item.

The invention is particularly advantageously applicable in the field of services on mobile terminals, particularly mobile telephones, and website access authentication services.

These days, a user who has a device for accessing the services available on websites stores on average five identifier and password pairs in order to be authenticated with the sites that he regularly consults, such as email, online banking, merchant sites, and so on. Added to these authentication data are the data used in professional life and in private life, such as a bank card code, a portable telephone code, a building access code, and so on. Normally, the amount of authentication data to be remembered by an individual more often than not exceeds his memory capabilities. To overcome this difficulty, some people resort to using the same code or the same identifier/password pair for multiple different applications. It will be understood that such behaviour obviously lowers the access security.

Because of this, numerous authentication data management systems have been developed which all offer the user the advantage of no longer having to memorize a large quantity of authentication data.

Among the proposed solutions there are management software packages coupled with a Web browser in personal computers. For the most part, these known software packages enable identifiers/passwords to be stored that are associated with the websites visited by the user. Some of them also make it possible to automatically input said identifiers/passwords in appropriate forms each time they log on to these sites. Moreover, the authentication data are stored in files protected by an access key.

Also known from the state of the art are management systems that enable the user to store his identifiers/passwords in a chip card via an appropriate reader linked to a personal computer. These systems offer the same functionalities as the abovementioned dedicated software packages, but with the added advantage of offering storage of the authentication data on a secure medium of the chip card type.

It will be obvious, however, that this type of management system involving a chip card presents the drawback of requiring the presence of a card reader on each personal computer where it is needed and a chip card specially dedicated to this application and that the user must always have with him if he wants at any time to use the service offered by the system managing his identifiers and passwords.

So, the technical problem to be resolved by the subject matter of the present invention is how to propose a system for managing at least one service access authentication data item, comprising a device for accessing at least one service, which would make it possible to obtain a security level at least equivalent to that presented by the known chip card management system, without, however, requiring a specific card or device intended to read this card.

The subject of the invention is a system for managing at least one service access authentication data item, comprising
- a device for accessing at least one service,
- a mobile terminal comprising means of managing said authentication data item and an identifier of said service,
- a communication interface between said access device and said management means,
- a software interface able to determine said service identifier and to utilize said management means, via the communication interface on access to said service, by means of commands making it possible to write, in a security module of said mobile terminal, short messages intended to be read by said management means.

Thus, it will be understood that implementing means of managing said authentication data item in a mobile terminal, a commonplace object that the user normally always carries around with him, enables the latter to be able to retrieve at all times his identifiers and passwords, for example, and utilize the inventive management system without involving any other medium, such as a dedicated chip card. Also, as will be seen in detail hereinbelow, no particular heavy or costly device such as a card reader needs to be considered which would compromise the versatility of the system. The use of short messages intended to be written in the security module makes it possible to control the management means simply and securely.

According to the invention, said management means are means of storing and restoring said authentication data item in association with said service identifier.

According to one particular embodiment of the invention, the management means are implemented in a security module of said mobile terminal or in a memory of said mobile terminal.

According to one particular embodiment, said mobile terminal comprises means of communication via a mobile telephone network, the security module being a subscriber identification card for said telephone network. The subscriber identification card is used to securely store trust data such as passwords or short messages for managing passwords.

Any other security module making it possible to securely store data can also be used, such as a chip card. The term "security module" should be understood to mean any software and/or hardware means forming a credential environment for the storage of data and/or the execution of services or programmes.

In a variant, said management means are implemented in the subscriber identification card. In practice, said subscriber identification card can be a SIM card or a UICC card (Universal Integrated Circuit Card).

The use of a mobile terminal equipped with a subscriber identification card, a SIM card in particular, presents certain advantages. In practice, it offers a high degree of security because the card is not directly accessible from a device such as a personal computer. Furthermore, since the SIM card is linked to the network, it is possible, in case of theft, to remotely erase the authentication data that it contains. Similarly, the user can make backups of said authentication data in the mobile telephone network. Finally, when said at least one authentication data item comprises an identifier and a password, it is possible to envisage having said password supplied to said management means by a password provider, particularly on requests made by a telephone link in the network. Otherwise, said password is stored in said storage means, just like the identifier.

Moreover, a mobile terminal offers numerous user interaction functionalities which can advantageously be exploited in the context of the invention, such as a screen and a keypad.

The benefit of the keypad is worth special mention since, in practice, it makes it possible, when said management means are read- and write-protected by an identification code, to enter the PIN code for accessing the SIM card in complete safety rather than using the keyboard on the accessing computer, which is more sensitive to hijacking. The various identifiers used can even be viewed on the screen of the terminal.

According to one advantageous variant, the management means are designed to be able to be driven by means of an appropriate user interface module, activated via the keypad and the screen of the mobile terminal. In this way, the user can at leisure consult his list of passwords, delete certain obsolete passwords, manually insert new ones, transmit one or other password by message to a third person, and so on.

It is also important to point out the possibility of being able to store in the SIM card other personal user codes, such as digicodes, a voicemail access password, various antitheft codes, telecommunication service codes and so on.

According to one particular embodiment of the invention, said access device is incorporated in said mobile terminal. In this case, it is envisaged that said mobile terminal will be of the smartphone type, that is, a mobile telephone provided with the functions of a personal digital assistant or a computer.

As a general rule, said service identifier comprises an address of said service in a telecommunication network, for example the URL of the website providing said service. However, the invention advantageously provides for said service identifier to comprise a digest of an address of said service in a communication network, namely in particular a digest obtained by applying a hashing function to said URL address. This embodiment makes it possible in practice to significantly increase the security level of the inventive system. In practice, said digest is produced by said software interface and supplied to the mobile terminal's management means, the SIM card in the example explained above. In this case, the service identifiers are preferably stored in digest form.

According to one characteristic of the management system that is the subject matter of the invention, said communication interface is an interface for communication via a local communication link. In particular, said local link is chosen from an infrared link, a Bluetooth link, an NFC link or a cable link.

Finally, advantageously, said communication interface is a modem communication interface, preferably using AT commands to write and read short messages in said subscriber identification card.

According to one particular embodiment, said mobile terminal comprises means for communicating with a provider of authentication data accessible via a mobile telephone network. The password can thus be supplied to the management means by a password provider.

The present invention also relates to a mobile terminal, comprising means of managing at least one service access authentication data item and an identifier of said service, said management means being linked to a device for accessing said service via a communication interface, said management means being utilized, via said communication interface on access to said service, by a software interface able to determine said service identifier, by means of commands making it possible to write, in a security module of said mobile terminal, short messages intended to be read by said management means.

The invention also relates to a software interface between a device for accessing at least one service and means of managing at least one authentication data item and an identifier of said service, said software interface being able to determine said service identifier and to control said management means, via a communication interface, by means of commands making it possible to write, in a security module of said mobile terminal, short messages intended to be read by said management means.

The invention also relates to a device for accessing at least one service, comprising such a software interface.

The present invention also relates to a method of managing at least one service access authentication data item for an access device comprising means of accessing at least one service, the method consisting, on accessing said service, in executing, by means of a software interface with said access means, steps consisting in:

detecting a request for at least one authentication data item for access to said service, determining an identifier of said service, utilizing means of managing, in a mobile terminal, said authentication data item and said identifier, via a communication interface between said access device and said management means, by means of commands making it possible to write, in a security module of said mobile terminal, short messages intended to be read by said management means.

The inventive method is advantageously implemented by means of a simple software interface communicating with the service access means and able to utilize, in particular to control, the means of managing said authentication data item and said identifier.

The description that follows in light of the appended drawings, given by way of nonlimiting examples, will clearly show what the invention comprises and how it can be produced.

FIG. 1 is a diagram of a general architecture of a management system according to the invention.

FIG. 2 is a diagram showing the algorithm implemented in the software interface of the inventive system.

FIG. 1 shows an architecture for a service access authentication data management system.

Figure 3:
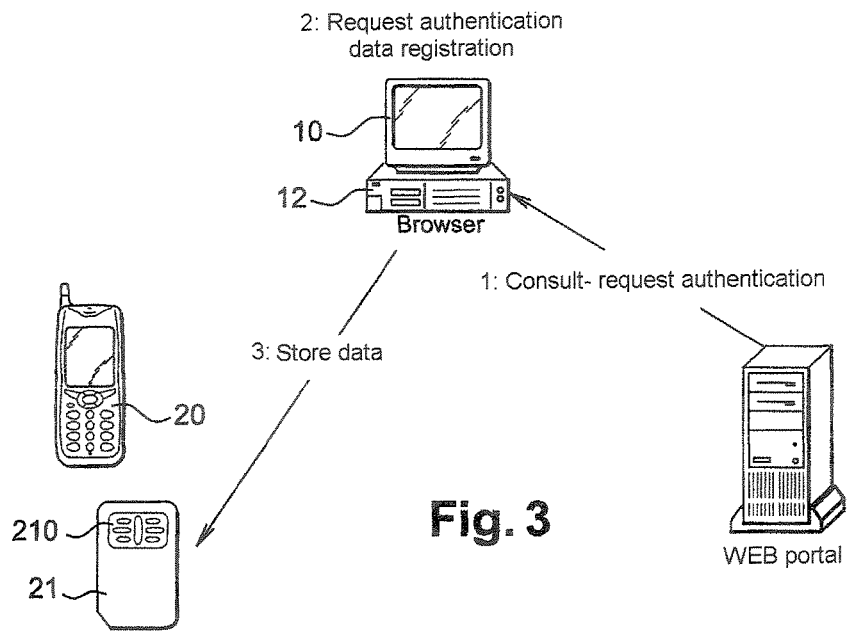
FIG. 3 is a diagram showing a first method of registering authentication data.

In the exemplary embodiment of FIG. 1, this management system comprises a device 10 for accessing said service comprising, on the one hand, a computer workstation 11, such as a personal computer (PC) and, on the other hand, a software package 12, for exploring the World Wide Web, also called Web browser. It is via this browser 12 that a user of said device 10 can access, via a TCP/IP link for example, websites 40 providing services.

In most cases, the actual provision of the services ordered by the users on the World Wide Web requires the submission of data authenticating said users in forms provided for this purpose on the corresponding websites 40.

It is because of the increasingly large quantity of authentication data that one and the some user now has to memorize that the invention proposes a management system whose main purpose is to:

detect authentication forms on Web pages, securely store in management means that will be explained later, the authentication data, more often than not an identifier and a password, entered on first accessing a website 40 in an authentication form, restore this data in order to perform an automatic authentication on this website 40 on subsequent accesses.

The management system of FIG. 1 also comprises a mobile terminal 20 which, in this example, is a mobile telephone equipped with a telecommunication network subscriber identification card 21. This card 21, such as a SIM card, is inserted into the mobile telephone 20 and is mainly used to secure access to the mobile operator's network. The SIM card can be replaced by a UICC card if it is fitted in a so-called third generation (3G) mobile telephone. Normally, access to the SIM or UICC card 21 is read- and write-protected by a secret code known as a PIN code.

In the context of the invention, the identification card 21 is also used to host means of managing authentication data and an identifier of the service to which they allow access. Said service identifier is, for example, the URL address of the corresponding website or even a digest obtained by applying a hashing function to said URL address.

Said management means are represented overall in FIG. 1 by the reference 210 which designates an application making it possible to securely store said data and the service identifier, and restore them for automatic input in an authentication form for accessing said service. This application 210 can be either a Javacard-type application, or a simple file protected by said PIN code.

Finally, it will be seen in FIG. 1 that the mobile terminal 20 comprises one end 22 of a local link with a module 30 for interfacing between the terminal and the access device 10 which will now be described in detail.

The access device 10 and the interfacing module 30 are preferably incorporated in one and the same computer device, for example in a personal computer (PC) or a data processing server.

Said interfacing module 30 for example takes the form of a software module suitable for being interfaced with the Web browser 12. It comprises a software interface 31 with the browser and a communication interface 32 for accessing the mobile telephone via the local communication link.

One purpose of the software interface 31 is to identify, to analyse each Web page loaded by the browser 12, to detect therein the presence of an authentication form and to trigger a mechanism for authenticating the user enabling the authentication fields of the form to be input automatically.

In the case where the Web browser 12 is Internet Explorer, the software interface 31 is implemented in COM (Component Object Model) object form and declared as a "Browser Helper Object". In this way, it is launched automatically by the Internet Explorer browser. When the browser is started up, the interface 31 instantiates an object of the class named "IWebBrowser2" representing an interface with the Web browser 12 and used to parse and process the Web pages loaded by the latter. For each Web page, the interface 31 searches for a form of <FORM> type comprising an <INPUT> element of "text" type followed by a single <INPUT> element of "password" type. If the Web page corresponds to these criteria, the software interface 31 interrogates the means 210 of managing the card 21 to ascertain if the address corresponding to the Web page being processed is referenced. If it is, the interface 31 asks the management means 210 to return to it the authentication data corresponding to said Web page, which are then automatically injected into the Web page after prompting the user for a PIN code, normally the PIN code of the mobile terminal or even a PIN code dedicated to the authentication application. Otherwise, the user is prompted to enter his identifiers and passwords, which are then captured by the software interface 31 and sent to the management means 210 accompanied by the address of the website. Then, these three data elements are stored in the card 21 in a file protected by PIN code. Depending on the implementations, particularly according to the choice of communication interface 32, the PIN code may be requested on the mobile terminal 20 or on the computer 11.

It is, of course, preferable for security reasons for the PIN code to be input on the mobile terminal 20 rather than on the computer 11 which is more vulnerable to access spoofing attempts. The benefit for the management system according to the invention to use a mobile terminal equipped with an integrated input keypad will thus be understood.

The parser function of the software interface 31 makes it possible to scan the content of a Web page in order to detect the presence of an authentication form. This function is run when the downloading of a Web page is complete. The Web page is scanned as follows:

recovery of the HTML document, scanning of the <FORM> elements contained in the document, scanning of all the elements contained in a <FORM> element and recovery of the <INPUT> elements, recovery of the type of the <INPUT> elements in order to find the identifier, the password and the submission field of the form, scanning of the <FRAME> elements of the document and recursive calls to the function for each element.

The authentication form detection function is therefore used to detect the identifier/password fields in a Web page. An authentication form is detected when it comprises an identifier followed by a password. The HTML document is scanned using the Web page parser and, for each "<FORM>" element, the "<INPUT>" elements are scanned in order to determine if the following configuration applies:

| | |
|---|---|
| <INPUT> of "text" type | identifier |
| <INPUT> of "password" type | password |

If the HTML document has such an authentication form, there are then two possibilities:

if it is a first visit to the website, the authentication data input by the user is stored on the card 21, provided that the user accepts the registration of this data.

if the user is already authenticated on this website, the authentication data is read in the card 21 and automatically input in the form.

The algorithm executed by the software interface 31 is represented in FIG. 2.

The purpose of the communication interface 32 is to enable the software interface 31 which has just been described to access the management means 210 via the mobile terminal 20.

In the case where the card 21 of the mobile terminal 20 is a SIM card, the interface 32 comprises a module hosted in the computer 11 named "SIM Access Client" which communicates with the SIM card 21 via the mobile telephone 20 and a local link of which the interface 32 has one end 320, the other end 22 being located on the terminal 20.

Said local link can be an IrDA infrared link, a Bluetooth short distance radio link, an NFC (Near Field Communication) very short distance link, or even a cable link.

The communication interface 32 can be implemented by AT commands of the modem in which the SIM card is housed. In practice, it is possible to use said AT commands for writing and reading short messages (SMS) in the SIM card to trigger the management means 210 hosted in the card. For this, it is sufficient for these means to use the "Event Download" mechanism described in the ETSI GSM 11.14 standard and subscribe to the "EVENT_UNFORMATTED_SMS_PP_UPD" event in order to be activated immediately an SMS is written. The management means 210 will than only have to read the SMS and process the data that are contained therein, to generate a response and to write said response in the SMS file of the SIM card. Generally, the AT commands are defined in the ETSI GSM 07.05 standard. The AT commands more specifically involved in this exemplary implementation are the commands for writing SMS in the SIM card (AT+CMGW) and reading SMS in the SIM card (AT+CMGR).

The incoming data sent by AT commands is the digest ("hash") of the URL address of the website, encapsulated in a data block. The outgoing data is authentication data encapsulated in the response to the AT command.

The communication interface 32 can also be implemented by means of the method described in the International patent application, no PCT/FR2003/0002802. In this case, the software interface 31 uses a PC/SC interface to access the SIM card and APDU (Application Protocol Data Unit) type commands enabling the dialogue with the management application.

Figure 4:
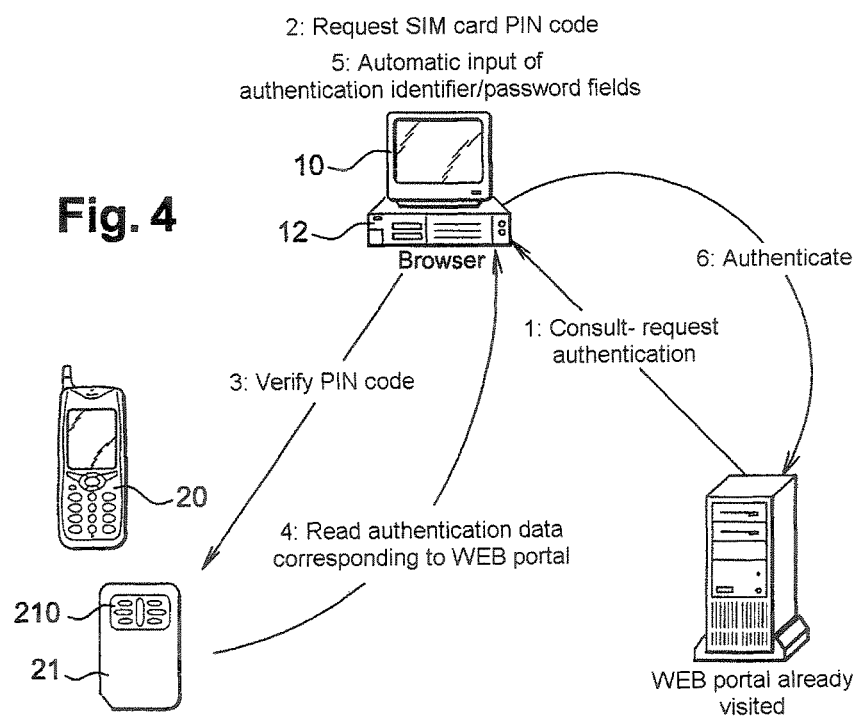
FIG. 4 is a diagram showing a first method of automatically authenticating data registered according to FIG. 3.

In a simplified version of the inventive system, the authentication data storage function handled by the management means 210 is implemented by an elementary file (EF) located in the SIM card. The process corresponding to this implementation is illustrated in FIGS. 3 and 4:

1. on an authentication request, the software interface 31 sends the URL of the website to the management means 210 of the SIM card 21 via the medium chosen for the local link (IrDA. Bluetooth, etc),
2. the management means 210 wait for a PIN code to be submitted, which can be specific to the management application or equal to the PIN code of the SIM card, and checks the validity of the PIN code entered,
3. the management means 210 look for the URL supplied in the elementary file located in the SIM card,
4. the management means 210 return the corresponding authentication data if they exist, otherwise they return a "not found" status to the software interface 31.

In a more sophisticated version, the authentication data storage function handled by the management means 210 is implemented by an application hosted in the SIM card 21. This application comprises a secure database containing the digests ("hashes") of the URLs and the authentication data.

Figure 5:
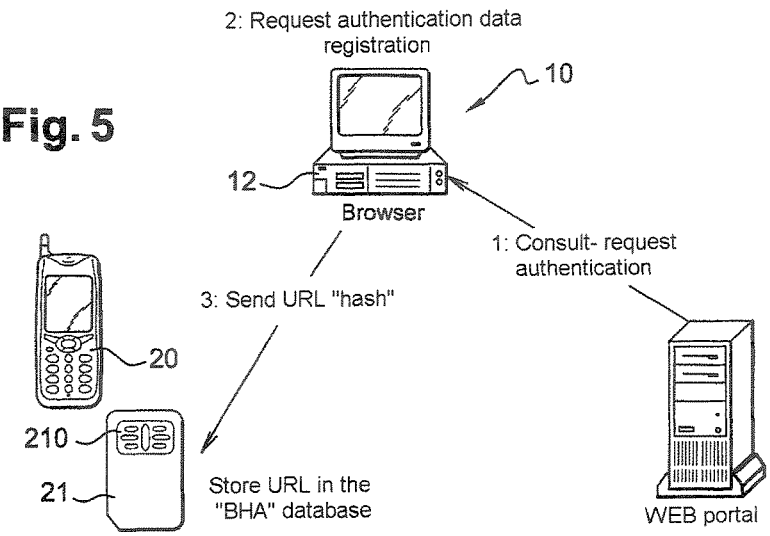
FIG. 5 is a diagram showing a second method of registering authentication data.
Figure 6:
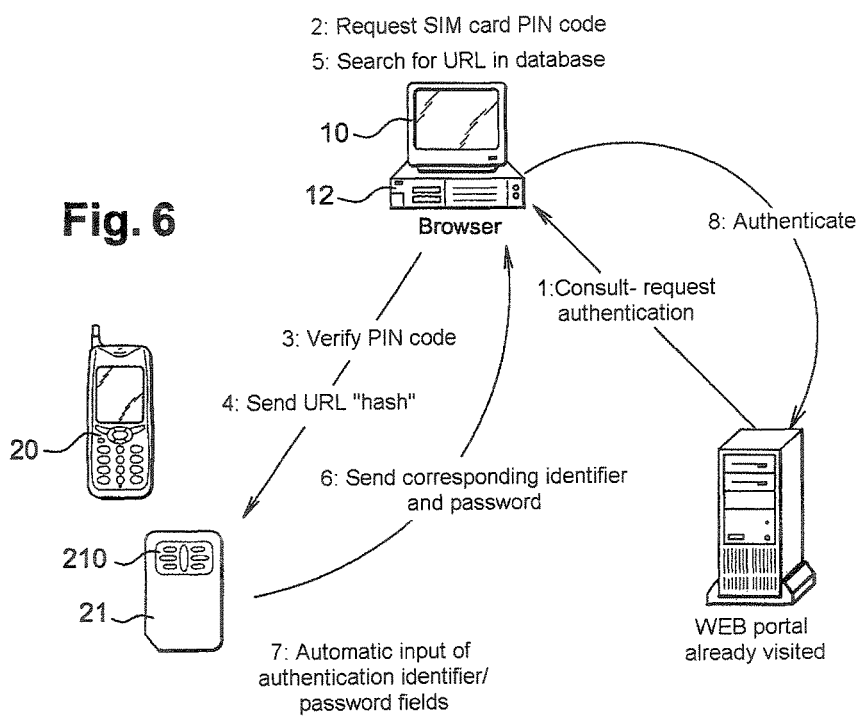
FIG. 6 is a diagram showing a second method of automatically authenticating data registered according to FIG. 5.

The kinematics corresponding to this implementation is illustrated in FIGS. 5 and 6:

1. on an authentication request, the software interface 31 sends a digest of the URL of the website to the application located in the SIM card via the medium chosen for the local link (IrDA. Bluetooth, etc),
2. the application waits fore PIN code to be entered, which can be specific to the management application or equal to the CHV1 PIN code of the SIM card, and checks the validity of the PIN code entered,
3. the application looks for the digest in the "BHA" database,
4. the application returns the corresponding authentication data if they exist, otherwise it returns a "not found" status to the software interface 31.

The latter method using the digests of the URLs makes it possible not to have to store the URLs in plain language in the SIM card. It is then impossible to retrieve the sites associated with the authentication data if the card is lost or the PIN code is stolen. It is also possible to consider encrypting or scrambling the authentication data.

To sum up, the management means 210 make it possible to:
securely store the authentication data (identifier, passwords and website addresses in URL form or URL digest form) in a proprietary file of the card 21,
authenticate the user by PIN code entry,
read these data on the card 21 for an automatic authentication,
use the authentication data on WEB/WAP sites accessed on the mobile terminal itself,
view the authentication data on the mobile terminal's screen,
make backups of the authentication data in the operator network,
manage the passwords of OTP (One-Time Password) type, as will be seen later.

The commands sent to the management application in the SIM card 21 are encapsulated either in an "envelope" instruction, or by sending proprietary APDU (Application Protocol Data Unit) commands.

The general format of such a command is given by the table below (the lengths of the various command fields are given here as number of bytes):

| NAME | DESCRIPTION | Length |
| --- | --- | --- |
| Command tag | Specifies the command sent to the management application | 1 byte |
| Le | Length of incoming data | 1 |
| Data | Incoming data | Le |

The general format of a response to this command is given by the table below:

| NAME | DESCRIPTION | Length |
| --- | --- | --- |
| Response tag | Equal to the corresponding command tag | 1 |
| Ls | Length of outgoing data | 1 |
| Data | Outgoing data | Ls |

The various commands/responses accepted by the application are:
PIN code verification command "VERIFY_PIN"

| Request | | | |
| --- | --- | --- | --- |
| NAME/VALUE | | DESCRIPTION | Length |
| Tag | EA | Request to management application to verify PIN code | 1 |
| Ls | Le | Length of incoming data | 1 |
| Data | Data | PIN code | Le |

| Response | | | |
| --- | --- | --- | --- |
| NAME/VALUE | | DESCRIPTION | Length |
| Tag | EA | Result of PIN code entry | 1 |
| Ls | Le | Length of outgoing data | 1 |
| Data | Data | ISO-IEC 7816-4 responses | Ls |

Authentication data storage request command "STORE_CREDENTIAL"

Request

| NAME/VALUE | | DESCRIPTION | Length |
|---|---|---|---|
| Tag | E0 | Request to management application to store authentication data linked to a URL | 1 |
| Ls | Le | Length of incoming data | 1 |
| Data | url<br>Login<br>Password<br>Domain<br>type | Authenticators | Le |

Response

| NAME/VALUE | | DESCRIPTION | Length |
|---|---|---|---|
| Tag | E0 | Response from management application to storage command | 1 |
| Ls | Le | Length of outgoing data | 1 |
| Data | Data | ISO-EC 7816-4 responses | Ls |

Command to obtain authentication data "GET_CREDENTIAL"

Request

| NAME/VALUE | | DESCRIPTION | Length |
|---|---|---|---|
| Tag | E1 | Request to management application to recover authentication data linked to a URL | 1 |
| Ls | Le | Length of incoming data | 1 |
| Data | ReqType<br>Key | =0x00 if search by url<br>=0x01 if search by hash(url)<br>url or hash(url) according to ReqType | Le |

Response

| NAME/VALUE | | DESCRIPTION | Length |
|---|---|---|---|
| Tag | E1 | Response containing authentication data associated with URL | 1 |
| Ls | Le | Length of outgoing data | 1 |
| Data | Login<br>Password<br>Domain<br>Type | Authentication data | Ls |

The authentication data are stored in a file named "EF RDPWD", access to which is protected by a PIN code. This file "EF RDPWD" is inserted in a new directory named "DF SIMPASS". The file "EF RDPWD" contains records of fixed length. It contains the URLs or digests of the URLs of the websites, and the corresponding identifiers/passwords, as indicated in the table below:

| 0x01 | 01 | URL - identifier - password - domain - config |
| 0x01 | 01 | URL - identifier - password - domain - config |
| ... | | |
| 0x01 | 01 | URL - identifier - password - domain - config |
| 0x00 | FF | FFFFFFFFFFFFFFFFFFFFFFFFFF |
| 0x00 | FF | ... |
| 0x00 | FF | FFFFFFFFFFFFFFFFFFFFFFFFFF |

The first element (first column of the table) is a presence flag; it indicates if the record is written (0x01 indicates that there are data written in the record. 0x00 indicates that it is empty).

The second element (second column of the table) defines the authentication data type which can be: 01: static, or 10: OTP.

The subsequent fields (third column of the table, "URL", "identifier", "password", "domain" and "config"), are stored in TLV (type/length/value) format.

The stored URL corresponds to the URL of the site, it is in a particular format to prevent it being too long. For example, if, for a site of a mobile operator "ABC", the complete URL is http://www.abc.fr/0/visiteur/PV, the URL will be stored in the form www.abc.fr.

Then come the identifier, the password, possibly the domain, and a configuration data block "config".

In the case of an OTP password type, the configuration data block "config" defines a pointer to a file containing the address of an OTP server.

There now follows a description of how the management system, the subject of the invention, operates in conjunction with a server managing OTP passwords.

It will be remembered that an OTP is a one-time password used to strongly and dynamically secure certain sites. The OTP resolves the password distribution and storage problems. This mechanism currently operates as follows:
  1. the user logs onto a website,
  2. the site prompts for an OTP on an authentication form,
  3. the user calls an OTP server by dialling a number on his telephone, most commonly in USSD (Unstructured Supplementary Services Data) mode,
  4. the OTP server sends him a temporary password to be typed into the authentication form,
  5. the client is billed by his telephone operator.

Figure 7:
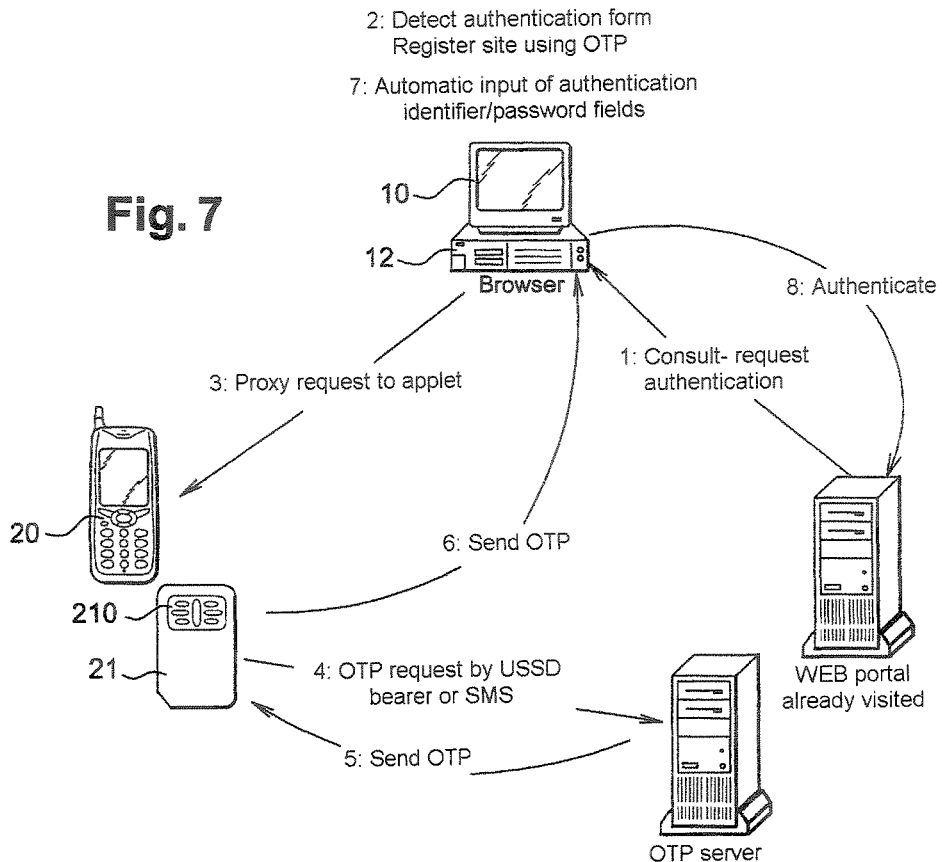
FIG. 7 is a diagram showing a method of automatic authentication by OTP.

In the context of the invention, the management application 210 in the card 21 is used as OTP manager according to the following mode of operation illustrated in FIG. 7:
  1. the software interface 31 detects an authentication form and the corresponding site is registered in the SIM card as a site using OTP. The information concerning the use of OTP is in the file EF RDPWD (column 2 of the table).
  2. the software interface 31 sends a proxy request to the management application of the card 21 to make an OTP request,
  3. the application makes this OTP request to a server, whose address is configured in the authentication database, that is, in the "config" data block of the file EF RDPWD, by USSD link by dialling the number of the OTP server,
  4. the management application recovers the OTP,
  5. the application returns the OTP to the software interface 31,
  6. the software interface completes the "password" field in the site's Web page.

Figure 8:
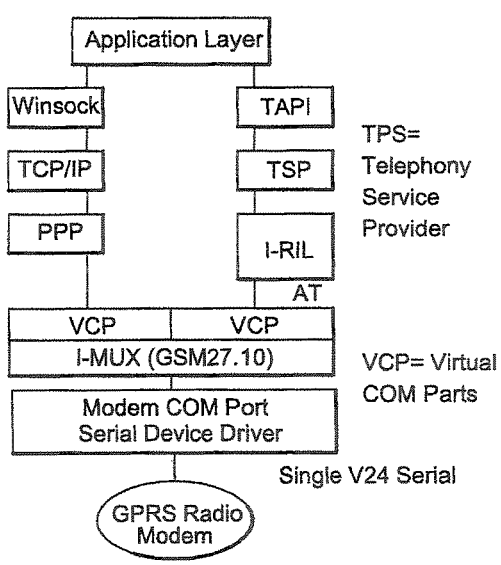
FIG. 8 is a diagram showing of the functions of a Microsoft Windows Mobile architecture.

One advantageous application of the invention relates to the case where the functions of the access device 10 are incorporated in a mobile telephone to form what is called a smartphone. In this case, the software interface 31 is added onto the mobile browser (WAP or XHTML) and communicates with the management application 210 located in the SIM card 21 to register and recover the authentication data associated with the Web page concerned. The following implementation is based on a Microsoft Windows Mobile type platform represented in FIG. 8.

In this architecture, one way of accessing the SIM card housed in the modem of the telephone is to use a low-level library which is the RIL (Radio Interface Layer) making it possible to produce proprietary programs having rights of access to the SIM card. This low-level application layer is the subject matter of patent application EP 1 233 343.

The RIL functions used by the software interface 31 to dialogue with the management application are as follows:
RIL_Initialize( ) which makes it possible to initialize the "RIL Driver" for use by a client. The RIL driver manages the dialogue with the modem and with the SIM card.
RIL_SendSimToolkitEnvelopeCmd( ) which sends a so-called "envelope" command to the SIM card. The "envelope" command is used to trigger an application located in the SIM card and send it data in download SMS form (SIM Data Download), in the same way as if the SMS were from an application server.

The "callback" mechanism provided by the RIL is used to recover a response relative to the called RIL function. In this case, this system enables the software interface 31 to recover the authentication data corresponding to the URL (or to its digest) sent in the "envelope" command.

The use of the command "RIL_SendSimToolkitEnvelopeCmd" enables the software interface 31 to trigger the management application 210 located in the SIM card and send it, as incoming data, the URL (or its digest) of the site, encapsulated in a data block in the 03.48 format and, as outgoing data, the authentication data encapsulated in the response to the command. To trigger the management application, the "envelope" command must include a header in the 03.48 format in which the TAR field must be equal to the identifier of the application on three bytes. After it has been triggered, the management application must ask the user for a PIN code to authenticate him. To implement this dialogue with the user, the application uses for example the "DISPLAY TEXT" and "GET INPUT" commands that are part of the development kit named SIM TOOLKIT. The commands of the SIM TOOLKIT are defined in standard 31.111 for 3G and 11.14 for 2G. The "DISPLAY TEXT" command can be used to display text on the screen of the mobile at the request of the application. The "GET INPUT" command can be used to return to the application the data input by the user, in this case, the PIN code.

The invention claimed is:

1. A system for managing at least one authentication data item, comprising:
   a device for accessing at least one service;
   a mobile terminal comprising management means for managing authentication data items and service identifiers, said management means comprising:
     means for storing in a security module of said mobile terminal at least one authentication data item in association with a service identifier; and
     means for restoring at least one authentication data item stored in association with a service identifier;
   a communication interface between said device and said management means; and
   a software interface in said device, configured to:
     determine a first service identifier of a first service;
     send to said management means at least one first authentication data item to be stored in said security module in association with said first service identifier; and
     control said management means, via said communication interface upon access to said first service so as to obtain from said management means said at least one first authentication data item stored in said security module in association with said first service identifier.

2. The system according to claim 1, wherein said management means is controlled by commands to write, in the security module of said mobile terminal, messages intended to be read by said management means.

3. The system according to claim 2, wherein said management means is implemented in said security module.

4. The system according to claim 2, wherein said communication interface is a modem communication interface using AT commands to write and read messages in said subscriber identification card.

5. The system according to claim 1, wherein said mobile terminal comprises means for communication via a mobile telephone network, said security module being a subscriber identification card for said telephone network.

6. The system according to claim 1, wherein said management means is implemented in a memory of said mobile terminal.

7. The system according to claim 1, wherein said mobile terminal comprises means for communicating with a provider of authentication data accessible via a mobile telephone network.

8. The system according to claim 1, wherein said management means is read-protected and write-protected by an identification code.

9. The system according to claim 1, wherein said communication interface is an interface for communication via a local communication link.

10. A mobile terminal comprising:
    management means for managing authentication data items and service identifiers,
    said management means comprising means for storing in a security module of said mobile terminal at least one authentication data item in association with a service identifier and means for restoring at least one authentication data item stored in association with a service identifier,
    said management means being linked via a communication interface to a device for accessing a service,
    said management means being controlled, via said communication interface upon access to a first service, by a software interface configured to determine a first service identifier of said first service,
    said management means receiving from said software interface at least one first authentication data item to be stored in said security module in association with said first service identifier,
    said management means providing to said software interface said at least one first authentication data item stored in said security module in association with said first service identifier.

11. A device for accessing at least one service comprising:
    a software interface configured for accessing the at least one service and for communicating with management means of a mobile terminal to manage authentication data items and service identifiers, said management means comprising means for storing in a security module of said mobile terminal at least one authentication data item in association with a service identifier and means for restoring at least one authentication data item stored in association with a service identifier, said software interface being further configured to:
determine a first service identifier of a first service;
send to said management means at least one first authentication data item to be stored in said security module in association with said first service identifier; and
control said management means, via a communication interface upon access to said first service so as to obtain from said management means said at least one first authentication data item stored in said security module in association with said first service identifier.

12. A method for managing at least one authentication data item for a device for accessing at least one service, said method comprising, on accessing a first service:
detecting a request for at least one authentication data item required for accessing said first service;
determining a first service identifier of said first service;
controlling, by a software interface, management means in a mobile terminal via a communication interface between said device and said management means, said management means being configured to manage authentication data items and service identifiers and comprising means for storing in a security module of said mobile terminal at least one authentication data item in association with a service identifier and means for restoring at least one authentication data item stored in association with a service identifier;
sending to said management means at least one first authentication data item to be stored in said security module in association with said first service identifier; and
obtaining from said management means said at least one first authentication data item stored in said security module in association with said first service identifier.

* * * * *

UNITED STATES PATENT AND TRADEMARK OFFICE
CERTIFICATE OF CORRECTION

PATENT NO. : 8,639,289 B2
APPLICATION NO. : 11/993697
DATED : January 28, 2014
INVENTOR(S) : Dagorn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1226 days.

Signed and Sealed this
Twenty-second Day of September, 2015

Michelle K. Lee
*Director of the United States Patent and Trademark Office*